3,141,782
PROCESSES FOR THE PRODUCTION OF
CERAMIC BODIES
David Thomas Livey, Harwell, and Peter Murray, Reginald Scott, and Jack Williams, Abingdon, England, assignors to The United Kingdom Atomic Energy Authority, London, England
No Drawing. Filed Mar. 14, 1958, Ser. No. 721,369
Claims priority, application Great Britain Mar. 14, 1957
5 Claims. (Cl. 106—55)

The invention relates to processes for the production of ceramic bodies comprising refractory metal oxides, and has as an object to provide a simple process for the production of ceramic bodies of high density from refractory metal oxides at moderate temperatures.

Refractory metal oxides from which ceramic bodies can be produced by the method of the invention include beryllia, magnesia, the alkaline earths (calcium, strontium, and barium monoxides), titanium dioxide, zirconium dioxide, hafnium dioxide, thorium dioxide, uranium dioxide, and plutonium dioxide, and mixtures of these, for example mixtures of uranium dioxide and beryllia.

They also include non-stoichiometric oxides, in which the oxygen content of the oxide exceeds that necessary for the stoichiometric formula of the oxide, but is not so great as to alter the crystalline form of the oxide from that of the stoichiometric compound. For example, non-stoichiometric uranium dioxide may contain oxygen in amount to satisfy a formula $UO_{2+x}$, where $x$ has a positive value not exceeding 0.25, without altering the cubic crystalline form of pure uranium dioxide. Above $UO_{2.25}$, the crystalline form of the oxide changes to tetragonal and then to other forms incorporating compounds such as $U_3O_8$. A description of the non-stoichiometric uranium dioxide compounds is given in the Journal of Inorganic and Nuclear Chemistry, volume 1, No. 6, page 357 (1955).

High density ceramic bodies may be produced from powders of such oxides by hot pressing at very high temperatures, e.g. at 1600° C., with pressures of about 1 ton/sq. in. or over, or by cold pressing at low temperatures and then sintering at high temperatures.

The improved sintering of non-stoichiometric uranium dioxides as compared with stoichiometric uranium dioxide has been disclosed, for example, in co-pending U.K. application No. 19,835/51 and is described in "Process in Nuclear Energy," Series V, volume 1, pages 454 to 463 (Pergamon Press, 1956).

It has not hitherto been possible, however, to produce high density compacts of these oxides by pressing at moderate temperatures, i.e. below 1000° C., without a subsequent sintering step at high temperatures. Such a sintering step leads to distortion of the compact, which is a disadvantage when accurate dimensions are required. Moreover it is desirable to avoid the use of such high temperatures to simplify equipment and reduce reactions of the oxide with mould and die materials.

It has now been discovered that if the crystallite size of these metal oxides, as shown by surface area measurement and X-ray diffraction studies, is less than a critical size, about 0.1 micron for stoichiometric oxides, and about 0.1 to 0.25 micron for non-stoichiometric oxides, depending on the extent by which the oxygen content of the oxide exceeds stoichiometric proportions, then strong, high density compacts of the oxides can be obtained by hot pressing at temperatures below 1000° C., using pressures less than or about 10 tons/sq. in. It is believed that this effect is almost entirely due to the smallness of the crystallites of the oxides, which gives rise to rapid sintering at these temperatures and pressures.

According to the invention, a method of producing a compact of a refractory metal oxide comprises hot pressing at a temperature between about 600° C. and 1000° C. a powder of said oxide having an average crystallite diameter of less than about 0.1 to 0.25 micron, according to the extent by which the oxygen content of the oxide exceeds stoichiometric proportions.

Also according to the invention, a method of producing a compact of a stoichiometric refractory metal oxide comprises hot pressing at a temperature between about 600° C. and 1000° C. a powder of said oxide having an average crystallite diameter of less than about 0.1 micron, and preferably less than about 0.05 micron.

Also according to the invention, a method of producing a compact of non-stoichiometric uranium dioxide having a formula $UO_{2+x}$, where $x$ has a positive value not exceeding about 0.25, comprises hot pressing at a temperature between about 600° C. and 1000° C. a powder of said dioxide having an average crystallite diameter of less than about 0.25 micron, and preferably less than about 0.1 micron.

Preferably the hot pressing is carried out at 700° C. to 800° C. and 5 to 10 tons/sq. in., whereby compacts of a density greater than 85% of the theoretical density of the oxide are produced.

Average crystallite diameter may be determined by X-ray diffraction methods, or by surface area measurement, e.g. by gas adsorption methods. In most circumstances determinations by these two methods give similar values for the average diameter, but in some circumstances they may differ. For example, if the individual crystallites are separate and distinct, but irregular in shape, the average diameter as determined by surface area measurement will be smaller than that given by X-ray diffraction. On the other hand, if the crystallites are joined together into an aggregate in which some fusion of their surfaces has occurred, then the average diameter as given by surface area measurement will be larger than that given by X-ray diffraction. In such cases it is the X-ray diffraction value which must be relied on.

Crystallite diameter is not to be confused with apparent particle diameter as seen under a microscope. The latter may be much larger, due to individual visible particles being composed of aggregates or skeletal structures of a large number of crystallites.

Oxide powders having average crystallite diameters less than the critical size may be prepared by a variety of methods according to the metal oxide required. For example, magnesia which has been prepared by the thermal decomposition in air or in vacuo of precipitated magnesium hydroxide at temperatures between 300° C. and 800° C. has a crystallite size less than 0.1 micron, as shown by the following table:

| Temperature of decomposition, ° C. | Surface Area (sq.m./gm.) | Average Crystallite diameter (micron) | |
|---|---|---|---|
| | | From surface area | From X-ray diffraction |
| 380 | 267 | 0.007 | 0.015 |
| 500 | 177 | 0.010 | 0.027 |
| 700 | 37 | 0.047 | 0.045 |
| 800 | 20 | 0.08 | |
| 1,000 | 9.0 | 0.19 | 0.24 |
| 1,380 | 4.5 | 0.37 | |

As further examples of methods of preparing oxide powders of average crystallite diameter below 0.1 micron may be instanced the following: the production of stoichiometric uranium dioxide $UO_2$ by the hydrogen reduction of the higher oxides of uranium $UO_3$ and $U_3O_8$; the production of beryllia by the thermal decomposition of beryllium hydroxide; and production of thoria and plutonium dioxide by the thermal decomposition of suitable compounds of thorium and plutonium, for example their hydroxides, oxalates, or carbonates.

Non-stoichiometric uranium dioxide of the required particle size may be prepared by controlled oxidation of hydrogen-reduced $U_3O_8$. Oxidation may occur during cooling after the reduction process, or the reduced material may be subsequently heated for a controlled period in air. Stoichiometric uranium dioxide will also oxidise spontaneously in air at normal temperatures, its oxygen content tending over a long period to a maximum, less than that corresponding to about $UO_{2.25}$, this maximum varying according to the particle size and method of manufacture of the starting material.

One advantage of producing dense compacts of refractory metal oxides by the method of the invention is, that no subsequent sintering step is necessary, so that cracking and distortion due to shrinkage are eliminated and compacts of accurate dimensions and high surface finish are produced directly by a single stage process if suitable die materials are used. Another advantage is that high temperatures, i.e. over 1000° C., are not employed, so that more convenient die materials may be used, e.g. nickel-chrome steels such as "Stellite," which have high oxidation resistance, may be used below about 800° C.

The invention will be more readily understood if reference is made to the following examples:

*Example I*

Magnesium hydroxide of very high purity (greater than 99.9%) was prepared by the following method: 330 ml. "0.880" ammonia solution was added to a solution of 500 gm. magnesium chloride hexahydrate in 180 ml. demineralised water at 70° C., care being taken to free the air in contact with the solutions from carbon dioxide; after stirring at 70° C. for 48 hrs., the precipitate was allowed to settle, and the mother liquor decanted off; after centrifuging, the remaining water was removed by evaporation at 70° C. under reduced pressure; the precipitate was then stored in a desiccator containing potassium hydroxide and phosphorus pentoxide.

Samples of this pure magnesium hydroxide were heated at 700° C. in air to form magnesia by thermal decomposition. The particle size of the magnesium powder thus formed was found from nitrogen gas adsorption methods to be about 0.047 micron and the crystallite size as measured by X-ray diffraction was about 0.045 micron. This powder was then hot pressed for 10 minutes in "Stellite" dies at 800° C. and 5 tons/sq. in. The compact so formed was strong and had a density of 3.16 gm./cc. which is 86.5% of the theoretical density of magnesia (3.65 gm./cc.). Another sample hot pressed at 800° C. and 10 tons/sq. in. was also strong and had a compacted density of 3.5 gm./cc. which is 96% of theoretical.

*Example II*

A sample of non-stoichiometric uranium dioxide having a formula $UO_{2.20}$, produced by oxidation in air of hydrogen-reduced $U_3O_8$, and having an average crystallite diameter of about 0.1 micron was hot pressed in a die of titanium carbide (bonded with nickel), at 800° C. and 5 tons/sq. in., and gave a strong compact having a density of 10.0 gm./cc., which is 90% of theoretical (about 11.1 gm./cc. for $UO_{2.2}$). Another sample of the same composition hot pressed at 800° C. and 10 tons/sq. in. was also strong, and had a compacted density of 10.75 gm./cc., which is 96% of theoretical.

*Example III*

A sample of beryllia, prepared by the thermal decomposition of beryllium hydroxide at 700° C. and having an average crystallite diameter of about 0.02 micron, was hot pressed in "Stellite" dies at 800° C., and gave a strong compact having a density of 2.70 gm./cc., which is 89.5% of theoretical (3.025 gm./cc.).

*Example IV*

A sample of non-stoichiometric uranium dioxide having a formula $UO_{2.08}$, produced by hydrogen-reduction of $U_3O_8$ under conditions in which subsequent oxidation was substantially less compared with the sample of Example II, and having an average crystallite diameter of about 0.25 micron was hot pressed as in Example II, at 10 tons/sq. in., and gave a strong compact having a density of 9.9 gm./cc. which is 90% of theoretical (about 11.0 gm./cc. for $UO_{2.08}$).

We claim:

1. A method of producing a compact of a refractory metal oxide comprising providing a powder from the group consisting of stoichiometric refractory metal oxide powders having an average crystallite diameter of less than about 0.1 micron and non-stoichiometric refractory metal oxide powders wherein the excess of oxygen in the oxide is not so great as to alter the crystalline form of the corresponding stoichiometric compound and having an average crystallite diameter of less than about 0.1–0.25 micron, and hot pressing the powder at a temperature of about 600–1000° C. and at a pressure of at least 5 tons per square inch.

2. A method according to claim 1 wherein the powder is hot pressed at a temperature of about 700–800° C. and at a pressure of about 5–10 tons per square inch.

3. A method according to claim 2 wherein the powder has an average crystallite diameter of less than about 0.05 micron.

4. A method according to claim 1 wherein the powder is selected from the group consisting of magnesia, beryllia, and uranium dioxide.

5. A method according to claim 4 wherein the powder is non-stoichiometric uranium dioxide having the formula $UO_{2+x}$, where $x$ has a positive value not exceeding about 0.25.

References Cited in the file of this patent

UNITED STATES PATENTS

| | | |
|---|---|---|
| 2,091,569 | Ridgway et al. | Aug. 31, 1937 |
| 2,538,959 | Ballard | Jan. 23, 1951 |
| 2,698,990 | Conant et al. | Jan. 11, 1955 |

OTHER REFERENCES

"The Properties of Magnesia Powders Prepared by the Decomposition of Magnesium Hydroxide," by Livey, Wanklyn, Hewitt, and Murray, A.E.R.E. M/R, 1957, May 1956.